(12) United States Patent
Wagener et al.

(10) Patent No.: US 10,894,864 B2
(45) Date of Patent: *Jan. 19, 2021

(54) ALIPHATIC POLYSULFONES WITH IMPROVED MECHANICAL INTEGRITY

(71) Applicant: UNIVERSITY OF FLORIDA RESEARCH FOUNDATION, INC., Gainesville, FL (US)

(72) Inventors: Kenneth B. Wagener, Gainesville, FL (US); Taylor W. Gaines, Chandler, AZ (US); Michael Bell, North East, MD (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/304,433

(22) PCT Filed: May 26, 2017

(86) PCT No.: PCT/US2017/034621
§ 371 (c)(1),
(2) Date: Nov. 26, 2018

(87) PCT Pub. No.: WO2017/205713
PCT Pub. Date: Nov. 30, 2017

(65) Prior Publication Data
US 2019/0144611 A1    May 16, 2019

Related U.S. Application Data

(60) Provisional application No. 62/341,787, filed on May 26, 2016.

(51) Int. Cl.
*C08G 75/20* (2016.01)
*B01D 71/68* (2006.01)
(Continued)

(52) U.S. Cl.
CPC ............ *C08G 75/20* (2013.01); *B01D 71/68* (2013.01); *C08J 3/24* (2013.01); *H01M 8/1027* (2013.01);
(Continued)

(58) Field of Classification Search
CPC ......... C08L 79/04; C08L 81/06; C08G 75/22; C08J 3/242
See application file for complete search history.

(56) References Cited

U.S. PATENT DOCUMENTS

2013/0277318 A1   10/2013   Weber et al.
2015/0352502 A1   12/2015   Moore et al.

FOREIGN PATENT DOCUMENTS

JP    2015-520662 A      7/2015
KR    10-2015-0036007 A  4/2015

OTHER PUBLICATIONS

Fawcett et al. (Macromolecules (1977), 10(4), 765-72).*
PCT/US2017/034621, International Search Report/Written Opinion, dated Sep. 8, 2017, 10 pages.

* cited by examiner

*Primary Examiner* — Shane Fang
(74) *Attorney, Agent, or Firm* — Timothy H. Van Dyke; Wolter Van Dyke Davis, PLLC

(57) ABSTRACT

A polysulfone has sulfone units that are separated by alkylene units in a polymer chain or a copolymer chain where the alkylene units have at least four carbons between sulfone units. The alkylene units can include an ethenylene unit separated from the sulfone units by at least one methylene units. The polysulfones can be crosslinked for enhanced thermal stability. Membranes can be formed from the polysulfones.

20 Claims, 6 Drawing Sheets

(51) Int. Cl.
    *C08J 3/24*      (2006.01)
    *H01M 8/1027*    (2016.01)
    *H01M 8/1032*    (2016.01)
    *C02F 1/44*      (2006.01)
    *C02F 103/08*    (2006.01)
    *H01M 8/1018*    (2016.01)

(52) U.S. Cl.
    CPC ............. *H01M 8/1032* (2013.01); *C02F 1/44* (2013.01); *C02F 2103/08* (2013.01); *H01M 2008/1095* (2013.01); *H01M 2300/0082* (2013.01)

ALIPHATIC POLYSULFONES WITH IMPROVED MECHANICAL INTEGRITY

CROSS-REFERENCE TO A-RELATED APPLICATIONS

This application is a 371 of PCT/US2017/034621 filed May 26, 2017 and claims the benefit of U.S. Provisional Application Ser. No. 62/341,787, filed May 26, 2016, the disclosures of which are hereby incorporated by reference in their entirety, including all figures, tables and drawings.

STATEMENT REGARDING FEDERALLY SPONSORED RESEARCH

This invention was made with government support under Grant No. W911 NF-13-1-0362 awarded by the Office of Army Research. The government has certain rights in the invention.

BACKGROUND OF INVENTION

Polysulfone is a term that has become synonymous with aryl sulfones. Commercial polysulfones are known for their excellent chemical and thermal stability. Polysulfones possess a superior service temperature range (150-200° C.) and good mechanical properties. Polysulfones often are used when polycarbonates and other engineering plastics cannot withstand conditions required. Sulfone functionalities add a polar feature to polymers and, unlike polyesters, polysulfones are resistant to acid and base hydrolysis. These features allow these thermoplastic polysulfone materials to find many high-end applications in the aerospace, medical, and automotive industries, and for consumer goods and machine parts.

Random aliphatic polysulfones are not as prevalent as their amorphous, rigid-rod, aromatic counterparts. Aliphatic sulfone copolymers are typically produced through free-radical polymerization of $SO_2$ and olefins, and these resulting polymers are stable to temperatures of around 200-225° C. However, these polymers have limited use due to their cost of production and because of undesirable structural defects, such as uncontrollable branching incurred during free-radical polymerization.

Faye et al., *J. Polym. Chem.* 2014, 5, (7), 2548-60, used acyclic diene metathesis (ADMET) polymerization to study the crystalline nature of aromatic etherethersulfone copolymers. ADMET polymerization has been carried out in the presence of oxidized sulfur functionalities, sulfonate esters, sulfonic acids, sodium salts, and sulfites or their sulfur containing precursors. ADMET polymerization yields precise structures, which often permit more viable materials. Polymers synthesized via ADMET exhibit better crystalline and thermal properties. Sulfone-ADMET compatibility could, therefore, allow production of linear, aliphatic polysulfones. To this end a precisely formed aliphatic polysulfone is desired.

BRIEF SUMMARY

In an embodiment of the invention, a polysulfone comprises sulfone units separated by alkylene units in a homopolymer chain or a copolymer chain. The alkylene units can be of the same mass and structure or can be of isomers of the same mass or oligomethylene units of different mass. The alkylene unit can be $C_4$ to $C_{36}$ units. The alkylene units can include an ethenylene unit such that it is separated from the sulfone units by at least one methylene unit. The polysulfone can be a crosslinked gel where on average at least two alkylene units of each homopolymer or copolymer chain or copolymer chain comprise a crosslinking unit between at least two polymer chains or copolymer chains. Crosslinks can be the reaction product of an ethenylene unit with a diacrylate or a dithiol or an ethenylene unit converted to an epoxy unit with a diol or a diamine.

Another embodiment of the invention is directed to a method of preparing a polysulfone where a monomer mixture of at least one α,ω-bis-vinylalkylsulfone monomer and/or a cycloalkenylsulfone with double bonds separated from the sulfone by at least one methylene unit are combined in a solvent is combined with a metathesis catalyst to initiate polymerization with the removal of ethylene to form a polymer comprising a multiplicity of sulfone units separated by alkenylene units where ethenylene units are separated from the sulfone units by at least one methylene unit. Optionally, at least a portion of the ethenylene units can be reduced to ethylene units. Optionally, a portion of the ethenylene units can be used to form crosslinking units.

DETAILED DISCLOSURE

Figure 1:
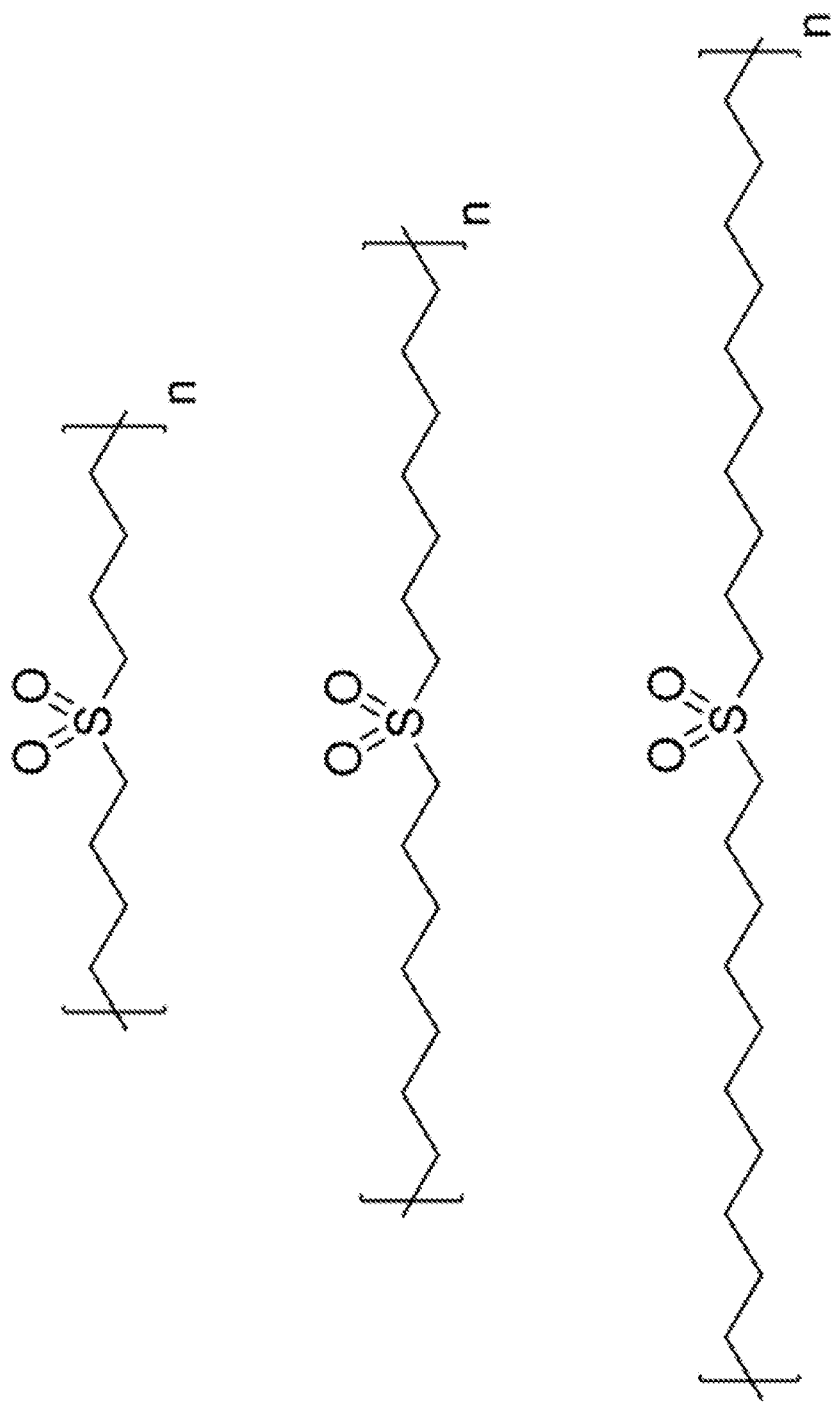
FIG. 1 shows aliphatic polysulfones with sulfone units situated every $8^{th}$, $14^{th}$, and $20^{th}$ methylene unit according to an embodiment of the invention.
Figure 2:
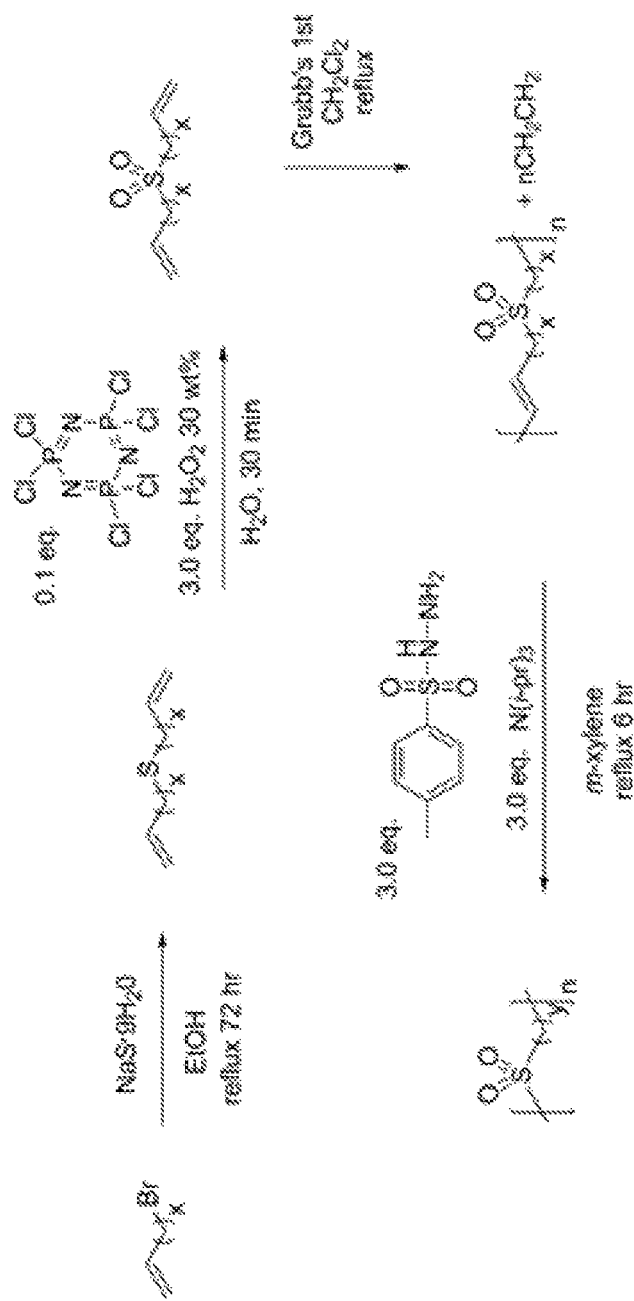
FIG. 2 shows a reaction schematic for the preparation of an α,ω-bis-vinylalkylsulfone, the ADMET polymerization to the α,ω-bis-vinylalkylsulfone, and the hydrogenation of the poly(α,ω-bis-vinylalkylsulfone) to a polysulfone.

Embodiments of the invention are directed to periodic, quasiperiodic, and quasirandom linear poly(alkanylsulfones), linear poly(alkenylsulfones), crosslinked poly(alkanylsulfones) and crosslinked poly(alkenylsulfones). Other embodiments of the invention are directed to, their preparation, and membranes or other devices therefrom. The structure of some polyalkenylsulfones, according to an embodiment of the invention, is shown in FIG. 1. The (alkanylsulfones), linear poly(alkenylsulfones), crosslinked poly(alkanylsulfones) and crosslinked poly(alkenylsulfones) can be prepared by the acyclic diene metathesis (ADMET) polymerization of one or more α,ω-bis-vinylalkylsulfones, where at least one methylene unit separates the terminal ene groups from the sulfone unit within the methylene units. Preparation and homopolymerization of α,ω-bis-vinylalkylsulfones are shown in FIG. 2. Subsequent hydrogenation of the ene units in the resulting aliphatic polysulfones is also shown in FIG. 2. Carrying out one or a series of reactions with the ene units within the poly(alkenylsulfone)s allows the formation of a structure that can be used in a membrane form or that has enhanced utility at temperatures of up to 200° C. or more. The polymerization of the monomer can be carried out using any known metathesis catalyst, for example, Schrock's catalyst (Mo(=CHCMe$_2$Ph)(N-2,6-C$_6$H$_3$-i-Pr$_2$)(OCMe(CF$_3$)$_2$)$_2$), Grubbs' first generation catalyst (RuCl$_2$(=CHPh)(PCy$_3$)$_2$), or Grubbs' second generation catalyst (1,3-bis-(2,4,6-trimethylphenyl)-2-imidazolidinylidene) dichloro(phenylmethylene) (tricyclo-hexylphosphine)ruthenium. Alternatively, ring-opening metathesis polymerization (ROMP) can be performed using one or more cycloalkenylsulfones where at least one methylene unit separates the ene from the sulfonyl unit. Generally, the cycloalkenylsulfone is smaller than an eight membered ring, which limits the separation of sulfonyl units along the chain. With even-numbered ring sizes, the sulfonyl units cannot be placed with equi-sized methylene sequences along the chain. Hence, for practical purposes, the seven-membered ring is about the largest functionalized cycloalkene that can result in a periodic placement of functional groups, which leads to a practical maximum of only six methylene units separating the sulfonyl units within the resulting polymer from ring-opening of cycloalkenylsulfones.

Figure 3A:
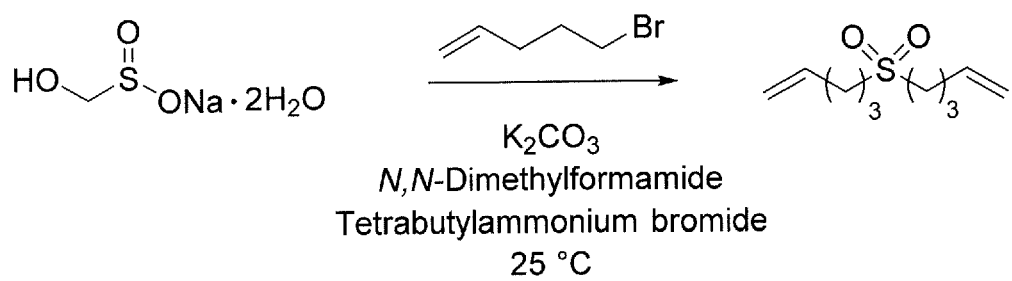
FIG. 3A shows a reaction scheme for a one-pot preparation of bis(pent-4-en-1-yl)sulfone.
Figure 3B:
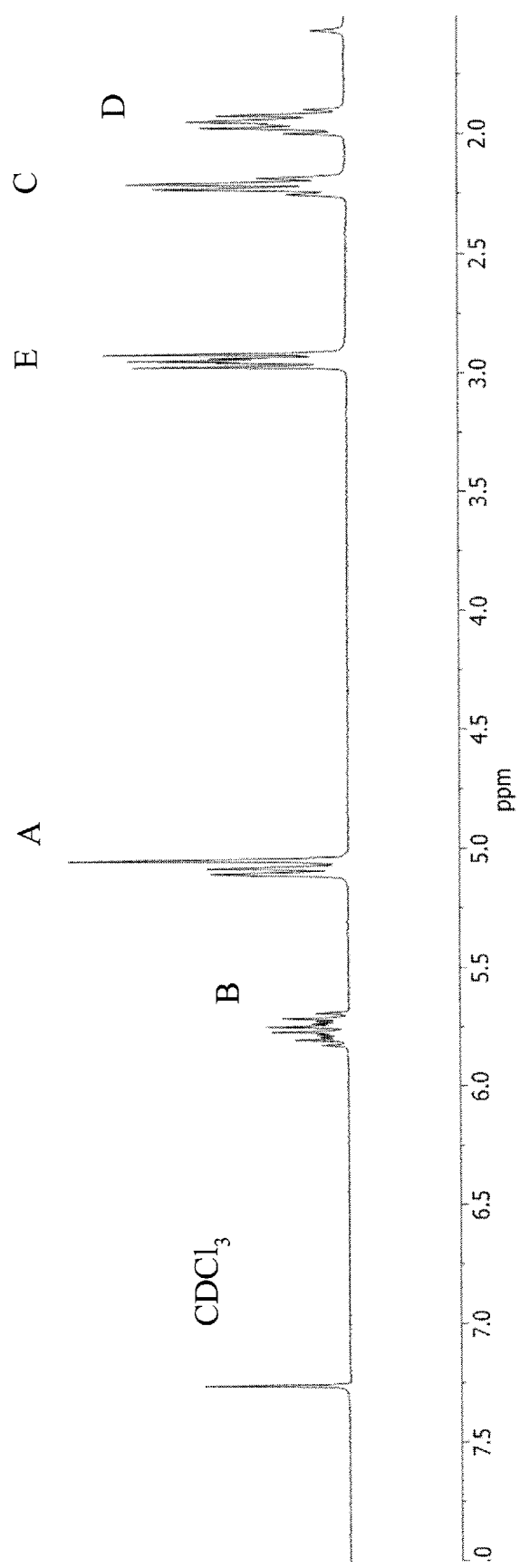
FIG. 3B shows the $^1$HNMR for the protons ω to α (A through F) of bis(pent-4-en-1-yl)sulfone prepared by the one-pot synthesis of FIG. 3A.

The preparation of the α,ω-bis-vinylalkylsulfone monomer can be carried out as shown in FIG. 2. The monomer can be prepared in two steps through a sulfide intermediate, as shown in FIG. 2, where x is the number of methylene groups in the monoene reagent and is the same or different, and is 1 to 20 or more. When x is the same value, the resulting symmetric monomer can be used to prepare a polymer that is periodic. Alternatively, as shown in FIG. 3A for the α,ω-bis-vinylpropylsulfone, characterization by $^1$HNMR shown in FIG. 3B, monomers can be prepared in a single step from sodium hydroxymethylsulfinate and ω-halo-α-alkenes.

When x is different, for example, an asymmetric α,ω-bis-vinylalkylsulfone monomer having an x and a y value that are different, a "quasiperiodic" polymer can be formed where the separating methylene units in the substituted polyethylene can be only 2x+2, 2y+2, and x+y+2 in a 1:1:2 ratio but no other values are possible. Alternatively, by employing two symmetric α,ω-bis-vinylalkylsulfones, one with two x length sequences and one with two y length sequences, or an asymmetric x and y monomer and a symmetric x and x monomer, the repeating unit sequences between functionalized methylenes of the ultimate substituted polyalkenylsulfone can be only 2x+2, 2y+2, and x+y+2, but the ratio of these units can differ from a 1:1:2 ratio and the longer range order will be different from that where there is a single asymmetric monomer. By tailoring the sequence lengths, for example, where the values of x and y are sufficiently similar, for example, x is about 1.05y to about 1.2y, or the proportion of y sequences is small, the disruption from periodicity may not prohibit a desired organization of the polymer into desired associations of the polymers. For example, in a membrane similar to that using periodic polymers, by promoting defects from periodicity, the processes of organization can be kinetically enhanced by the structural defects with little penalty in the ultimate organized structure.

A "quasirandom" structure can occur where more than two x sequence lengths are employed. For example, x, y and z sequences can be formed when at least two α,ω-bis-vinylalkylsulfone monomers and with at least one being asymmetric, or when three monomers of any type are employed. Inherently, the method employed for preparation of the polymers does not permit a sequence between sulfone units of less than four methylene units; a truly random copolymer is not possible with these monomers. Alternatively, monomers with a plurality of sulfone groups separated by sized methylene sequences could be constructed that could ultimately be combined alone or with α,ω-bis-vinylalkylsulfone monomers to generate what approximates truly random polysulfones.

The α,ω-bis-vinylalkylsulfone monomers can include alkylene sequences that are branched or substituted. The α,ω-bis-vinylalkylsulfone monomers can be copolymerized with C$_5$ to C$_{20}$ α,ω-alkyldiene monomers or cycloalkane monomers to give random copolymers where the carbon chains are extended between sulfone units. The α,ω-bis-vinylalkylsulfone monomers can be copolymerized with α,ω-bis-vinylalkylsulfides.

Figure 4:
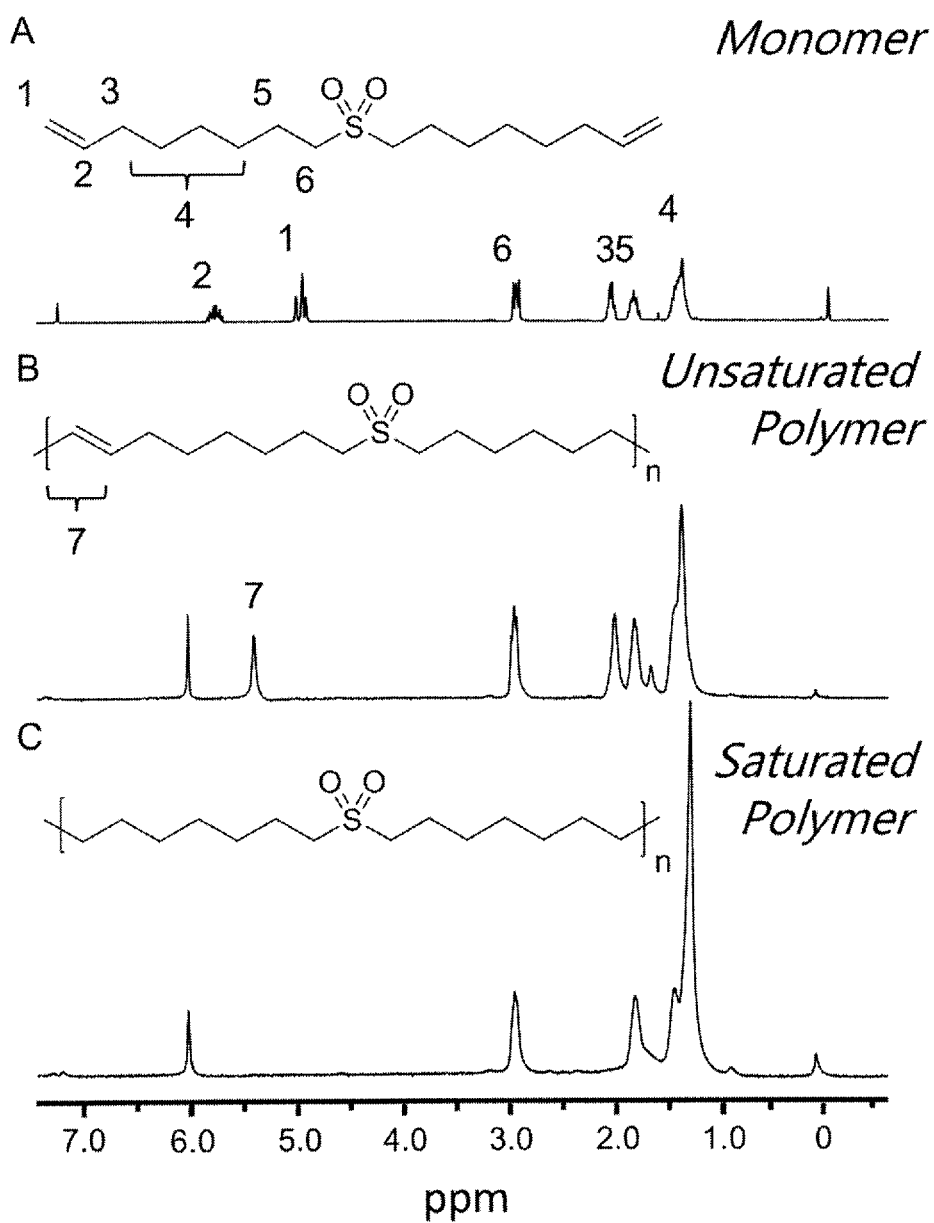
FIG. 4 shows composite $^1$HNMR spectra with labeled signals ($CDCl_3$) for the α,ω-bis-vinylalkylsulfone with six methylene units per arm (A); the unsaturated polysulfone formed by ADMET polymerization ($C_2D_2Cl_4$) (B) and the saturated aliphatic polyalkanylsulfone ($C_2D_2Cl_4$) (C).

After ADMET or ROMP polymerization, the poly(α,ω-bis-vinylalkylsulfone) can be reduced to the polysulfone, as shown in FIG. 2. Hydrazide reduction, for example, with toluenesulfonylhydrazide (TSH), can be carried out in solution in the presence of a trialkylamine. The reduction can be carried out with effectively complete conversion of the olefin using an excess of the hydrazide, or a controlled degree of reduction is possible by using a deficiency of the hydrazide. As indicated in FIG. 4, the reduction is easily followed by analytical methods, including, but not limited to, $^1$H NMR spectroscopy.

The ADMET polymerization is carried out in solution at reflux to promote the increase of molecular weight by the loss of ethylene. The solvent can be a low boiling solvent, such as methylene chloride, or a higher boiling solvent, such as, but not limited to, 1,2-dichloroethane, 1,1,2,2,-tetrachloroethane, toluene, xylenes, ethyl acetate, and THF. Polymers prepared in methylene chloride using Grubbs' First Generation catalyst are indicated in Table 1, below.

TABLE 1

Molecular Weight and Thermal Properties of Poly(aliphatic sulfones)

|  | Sulfone Polymer[a] | $\overline{M}_w$ (g/mol)[b] | Sulfone/ 500 carbons | $T_m$ (° C.)[c] | ΔH (J/g) | $T_{95\%}$ (° C.)[d] |
|---|---|---|---|---|---|---|
| Saturated | SO$_2$8U | 13,800 | 62 | 113 | 32.5 | 302 |
| Unsaturated | SO$_2$14U | 15,800 | 35 | 125 | 27.6 | 325 |
|  | SO$_2$20U | 4,800 | 25 | 131 | 37.7 | 345 |
|  | SO$_2$8 | — | 62 | 175 | 49.1 | 260 |
|  | SO$_2$14 | — | 35 | 167 | 47.9 | 290 |
|  | SO$_2$20 | — | 25 | 147 | 91.4 | 277 |

[a]Unsaturated polymers provided by ADMET polymerizations of 24 hr duration and indicated by the number carbons in the symmetric monomer indicated with "U" for the unsaturated polymer upon polymerization and the saturated polymer formed upon reduction;
[b]molecular weights determined by DOSY in C$_2$Cl$_4$D$_2$;
[c]$T_m$ obtained from DSC at 10° C./min.;
[d]5% decomposition determined from TGA at 10° C./min.

Figure 5:
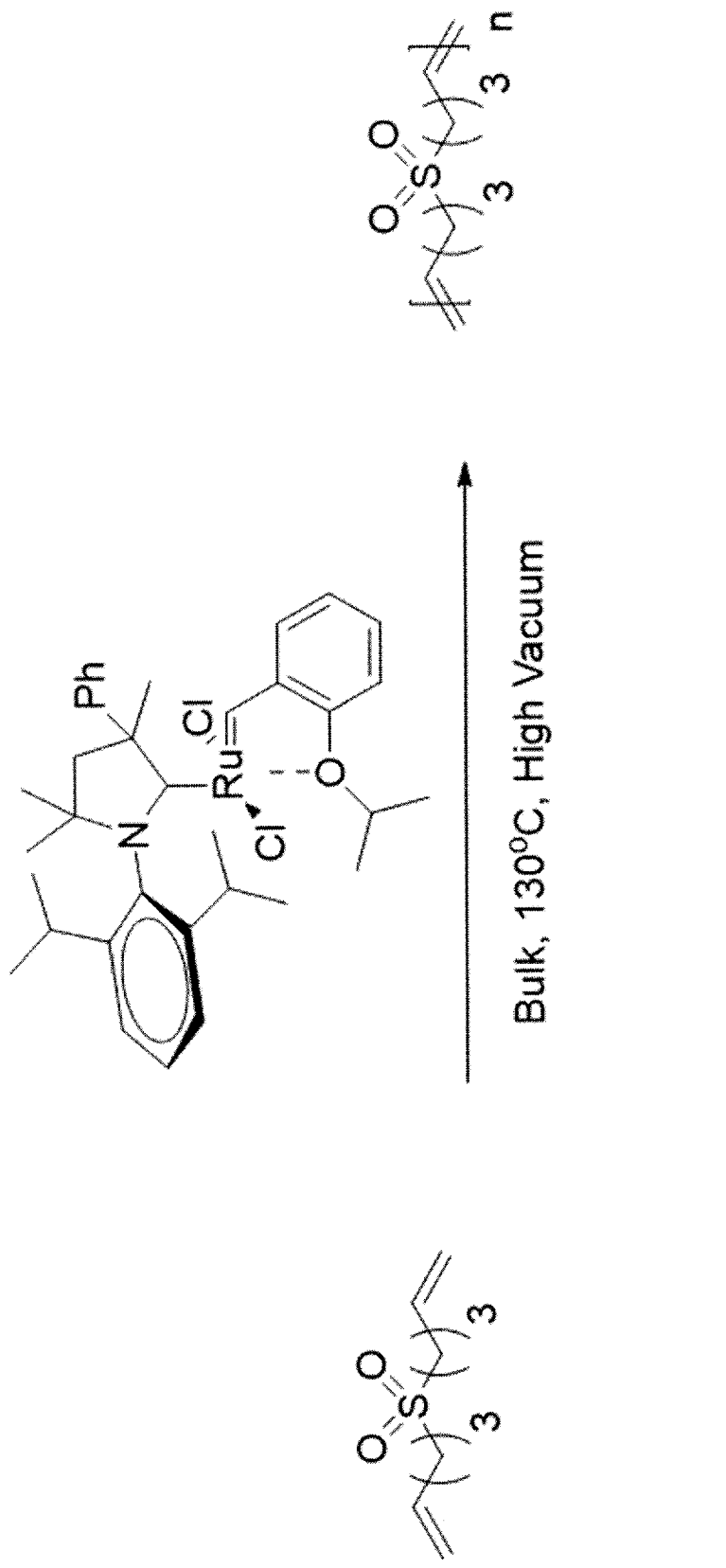
FIG. 5 shows a reaction schematic for the preparation of a poly(α,ω-bis-vinylalkylsulfone) by the solventless ADMET polymerization of bis(pent-4-en-1-yl)sulfone, according to an embodiment of the invention.

Grubb's catalyst (C668), Dichloro[1-(2,6-diisopropylphenyl)-2,2,4-trimethyl-4-phenyl-5-pyrrolidinylidene](2-isopropoxyphenylmethylene)ruthenium(II), allows synthesis of polysulfones without solvent, as indicated in FIG. 5, above the melting temperature of the polymer without olefin isomerization. Molecular weight measurements were made using HFIP GPC vs polystyrene standards. Using this solvent-free technique higher molecular weight polymer are possible, as indicated in Table 2, for the polymerization of below.

TABLE 2

Polymerization of bis(pent-4-en-1-yl)sulfone using Grubb's catalyst (C668)

| Sample | Reaction time (hrs) | Temperature °C. | Mole Ratio catalyst to monomer | Molecular weight $M_w$ (g/mol) |
|---|---|---|---|---|
| 53 | 42 | 150 | 0.003 | 28,448 |
| 10 | 72 | 130 | 0.002 | 23,992 |
| 55 | 43 | 150 | 0.005 | 36,544 |

Post-ADMET polymerization, carbon-carbon double bonds can be reacted to provide crosslinking. Reaction of between 0.1% and 35% of the double bonds within polymer samples results in a significant improvement in mechanical properties. Crosslinking reactions that can be carried out with the unsaturated polymers include, but are not limited to, free-radical reactions, olefin metathesis with triene molecules, epoxidation followed by addition of various hardeners, thiol-ene and other "click" reactions. Crosslinking can be carried out via: a diacrylate reacting with ADMET double bonds; a dithiol reaction with ADMET double bonds; the epoxidation of the ADMET double bonds followed by diol or diamine addition; bromination of double bonds followed by reaction with a difunctional nucleophilic reagent; or by addition of photo reactive crosslinkers. Alternatively, high energy irradiation of a device prepared from the reduced sulfone, for example, in the form of a membrane, can be carried out to crosslink and to stabilize the membrane. Such a crosslinked membrane, or other device, can be used as a component of a fuel cell or a water desalination device.

METHODS AND MATERIALS

Materials and Instrumentation

All chemicals, materials, and solvents were purchased through Sigma Aldrich unless otherwise noted. Dry solvents where obtained from a solvent purification system when needed. Monomers were purified using SiliCycle Silia-Flash® P60, 40-63 µm, 60 Å silica. Grubbs' 1st generation catalyst was donated by Materia, Inc. and used as received. IR spectroscopy and data analysis was performed using a PerkinElmer FTIR Spectrum One with ATR attachment and Spectrum Software. A Varian Mercury-300 NMR Spectrometer was used to obtain both 1H NMR and 13C NMR spectra using VNMRJ software. Due to the insolubility of polymers in most solvents, DOSY NMR was performed on a Varian-500 NMR Spectrometer in deuterated tetrachloroethane at 25° C. Elemental analysis was performed by Atlantic Microlabs and mass spectroscopy was performed by the Mass Spec labs in the University of Florida's Chemistry Department.

Synthetic Procedures

Bis(undec-10-en-1-yl)sulfide. A solution of 105 g (0.437 mols, 1.47 eq.) sodium sulfide nonahydrate was dissolved in 95 mL of 200 proof ethanol (~0.2 mL/mmol of sodium sulfide nonahydrate) in a 500 mL round bottom flask. To this solution was added 70 g of 11-bromo-1-undecene (0.300 mols, 1.0 eq.) and the reaction mixture was refluxed for 72 hours. The flask was flooded with distilled water, stirred, and the product was allowed to separate from the aqueous layer. The organic layer was removed and washed twice with a 5% sodium hydroxide solution, and once with water. The product was isolated as a yellow viscous oil, dried under vacuum and used without further purification. Yield: 50.52 g, 99.5%. $^1$H NMR (300 MHz, CDCl$_3$): δ (ppm) 5.70-5.84 (m, 2H), 4.87-4.99 (m, 4H), 2.49 (t, 4H), 1.96-2.03 (m, 4H), 1.74-1.84 (m, 4H), 1.17-1.43 (m, 24H); $^{13}$C NMR (75 MHz, CDCl$_3$) δ 139.3, 114.3, 77.6, 77.2, 76.8, 34.0, 32.4, 29.9, 29.7, 29.5, 29.3, 29.2, 28.9. Elemental Analysis: calcd for $C_{22}H_{42}S$, C: 78.03, H: 12.50, S: 9.47; found C: 78.19, H: 12.55, S: 9.58.

In like manner, the procedure described above was used for the synthesis of bis(oct-7-en-1-yl)sulfide and bis(pent-4-en-1-yl)sulfide as well. Spectra of all sulfides were consistent with published spectra.

Bis(oct-7-en-1-yl)sulfide. Yield: 80%. $^1$H NMR (300 MHz, CDCl3): δ (ppm) 5.73-5.86 (m, 2H), 4.91-5.02 (m, 4H), 2.49 (t, 4H), 1.99-2.07 (m, 4H), 1.57-1.62 (m, 4H), 1.26-1.43 (m, 12H); $^{13}$C NMR (75 MHz, CDCl$_3$) δ (ppm) 139.2, 114.4, 77.7, 77.2, 76.8, 33.9, 32.3, 29.9, 29.0, 28.9. Elemental Analysis: calcd for $C_{16}H_{30}S$, C: 75.52, H: 11.88, S: 12.60; found C: 75.49, H: 11.84, S: 12.67.

Bis(pent-4-en-1-yl)sulfide. Yield 85%. $^1$H NMR (CDCl$_3$): δ (ppm) 5.77-5.87 (m, 2H), 4.94-5.08 (m, 4H), 2.49-2.57 (t, 4H), 2.17-2.25 (q, 4H), 1.81-1.76 (m, 4H); $^{13}$C NMR (CDCl$_3$): δ (ppm) 29.03, 31.63, 33.06, 115.31, 138.03. Elemental Analysis: calcd for $C_{10}H_{18}S$, C: 70.52, H: 10.65, S: 18.82; found C: 70.49, H: 10.70, S: 18.73.

Monomer Synthesis

Bis(undec-10-en-1-yl)sulfone. To a 50 mL round bottom flask 15.0 g (0.044 mols) of bis(undec-10-en-1-yl)sulfide, 10 mL of distilled water, and 1.5 g (0.1 eq.) of hexachlorophosphazene were added and stirred at 0° C. A 13 mL (0.130 mols) aliquot of 30% hydrogen peroxide was added dropwise and the reaction mixture was allowed to warm to room temperature. The reaction mixture was stirred for 30 mins, at which point a white solid formed. The reaction was extracted with ethyl acetate (4×25 mL). The organic layer was dried over magnesium sulfate before removal of the solvent. The crude sulfone was recrystallized from ethanol and subsequently passed through a silica plug using a hexanes:ethyl acetate (9:1) eluent. Yield: 15.77 g, 96%. $^1$H NMR (300 MHz, CDCl$_3$): δ (ppm) 5.70-5.84 (m, 2H), 4.87-4.99 (m, 4H), 2.89 (t, 4H), 1.96-2.03 (m, 4H), 1.74-1.84 (m, 4H), 1.17-1.43 (m, 24H); 13C NMR (75 MHz, CDCl3) δ (ppm) 139.4, 114.4, 77.7, 77.2, 76.8, 52.9, 34.0, 29.6, 29.4, 29.3, 29.1, 28.7, 22.2. HRMS (ESI) (m/z): (M+H)+ calcd for $C_{22}H_{42}O_2S$ 371.2978; found 371.2983. Elemental Analysis: calcd for $C_{22}H_{42}O_2S$, C: 71.29, H: 11.42, S: 8.65; found C: 71.58, H: 11.48, S: 8.50.

In like manner, the procedure described above was used for the synthesis of bis(oct-7-en-1-yl)sulfone and bis(pent-4-en-1-yl)sulfone as well.

Bis(oct-7-en-1-yl)sulfone. Yield 79%. $^1$H NMR (300 MHz, CDCl$_3$): δ (ppm) 5.68-5.82 (m, 2H), 4.89-4.99 (m, 4H), 2.91 (t, 4H), 1.97-2.07 (m, 4H), 1.74-1.85 (m, 4H), 1.27-1.46 (m, 12H); 13C NMR (75 MHz, DMSO) δ (ppm) 139.4, 115.4, 52.2, 40.7, 40.5, 40.2, 39.9, 39.6, 39.4, 33.7, 28.7, 28.2, 21.9. HRMS (ESI) (m/z): (M+H)+ calcd for $C_{16}H_{30}O_2S$ 287.2039; found 287.2037. Elemental Analysis: calcd for $C_{16}H_{30}O_2S$, C: 67.08, H: 10.56, S: 11.19; found C: 65.42, 10.33, S: 10.82.

Bis(pent-4-en-1-yl)sulfone. Yield 92%. $^1$H NMR (300 MHz, CDCl$_3$): δ (ppm) 5.69-5.82 (m, 2H), 5.03-5.11 (m, 4H), 2.93 (t, 4H), 2.18-2.25 (m, 4H), 1.74-1.85 (m, 4H); $^{13}$C NMR (75 MHz, CDCl$_3$) δ (ppm) 135.8, 116.1, 76.9, 76.5, 76.1, 51.6, 31.7, 20.6. HRMS (ESI) (m/z): (M+H)+ calcd for C10H18O2S 203.1100; found 203.1101. Elemental Analysis: calcd for C10H18O2S, C: 59.37, H: 8.97, S: 15.85; found C: 59.28, H: 9.06, S: 15.59.

Bis(pent-4-en-1-yl)sulfone alternate synthesis. Sodium hydroxymethylsulfinate (2.0 g, 16.8 mmol), potassium carbonate (23 g, 166 mmol), tetrabutylammonium bromide (0.40 g, 1.68 mmol) and 5-bromo-1-pentene (5.0 g, 33.6 mmol) were suspended in a 2:1 DMF:water mixture (200 ml). The suspension was stirred for 72 hours at room temperature. The reaction was quenched with cold water (50 ml). The aqueous suspension was then extracted with dichloromethane (50 ml) three times. The organic portion was isolated and washed with water three times. The organic was again isolated and dried over anhydrous magnesium sulfate. Solids were removed via filtration and solvent was removed under vacuum. The crude product was isolated by column chromatography over silica gel using a 9:1 Hexane:ethyl acetate mixture as eluent.

Polymerization Procedures

Polymerization of Bis(undec-10-en-1-yl)sulfone. To a dry 50 mL Schlenk tube containing a stir bar was added a 2M solution of 1.0 g of monomer (2.7 mmols) in dichloromethane. The solution was subjected to multiple freeze-pump-thaw cycles until no visible gases were expelled from the solution. Before the final thaw, 1 mol % Grubbs' First Generation catalyst was added to the flask, and the vessel was equipped with a reflux condenser and argon flow adapter. The apparatus was evacuated and purged with argon before refluxing for 72 hours. After the allotted polymerization time, the polymer precipitated from solution. Ethyl vinyl ether and tetrachloroethane were added to quench the polymerization and dissolve the polymer. The polymer was precipitated from cold methanol, filtered, collected, and dried under vacuum before characterization. $^1$H NMR (300 MHz, C$_2$D$_2$Cl$_4$) δ (ppm) 5.89-5.76 (m, 2H), 5.40-5.30 (m, 2H), 5.03-4.92 (m, 4H), 2.94-2.89 (t, 4H), 2.05-1.93 (m, 4H), 1.84-1.69 (m, 4H), 1.46-1.28 (m, 24H); $^{13}$C NMR (75 MHz, C$_2$D$_2$Cl$_4$) δ 139.1, 130.2, 129.8, 114.2, 52.5, 33.6, 32.5, 29.5, 29.2, 29.1, 28.9, 28.3, 27.1, 21.8. FT-IR (ATR) v in cm$^{-1}$ 2918, 2847, 1461, 1414, 1327, 1274, 1248, 1225, 1123, 1098, 964, 909, 774, 724, 603.

Polymerization of Bis(oct-7-en-1-yl)sulfone. $^1$H NMR (300 MHz, C$_2$D$_2$Cl$_4$) δ (ppm) 5.44-5.37 (m, 2H), 2.95-2.89 (t, 4H), 2.00-1.95 (m, 4H), 1.84-1.71 (m, 4H), 1.47-1.25 (m, 12H); $^{13}$C NMR (75 MHz, C$_2$D$_2$Cl$_4$) δ (ppm) 130.5, 74.5, 74.2, 73.8, 52.9, 32.6, 29.4, 28.6, 22.2. FT-IR (ATR) v in cm−1 2918, 2849, 1459, 1412, 1326, 1274, 1249, 1203, 1122, 1082, 965, 773, 727, 668, 602.

Polymerization of Bis(pent-4-en-1-yl)sulfone. $_1$H NMR (300 MHz, CDCl$_3$) δ (ppm) 5.53-5.38 (m, 2H), 3.01-2.87 (t, 4H), 2.26-2.14 (m, 4f1), 1.95-1.82 (m, 4H); $^{13}$C NMR (75 MHz, CDCl$_3$) δ (ppm) 131.4, 75.6, 75.2, 74.9, 53.4, 32.4, 22.9. FT-IR (ATR) v in cm$^{-1}$ 2942, 2860, 1451, 1412, 1321, 1275, 1235, 1119, 1078, 1017, 965, 841, 774, 742, 703.

Hydrogenation of Unsaturated Polysulfones

Poly((eicosanyl)sulfone). Similar to a literature procedure, 250 mg of poly((eicos-10-en-yl)sulfone) was suspended in 20 mL of anhydrous m-xylene. Next, 0.9 g (3 eq.) of p-toluenesulfonylhydrazide (TSH) and 1 mL of tripropylamine (TPA) was added to the flask. The reaction was allowed to reflux for 3.5 hours, after which an additional 3 eq. TSH and TPA was added. The reaction was again refluxed for 3.5 hours and then condensed to half the original volume before being precipitated into cold methanol. The polymers were filtered and dried under high vacuum. $^1$H NMR (300 MHz, C$_2$D$_2$Cl$_4$) δ (ppm) 2.95-2.89 (t, 4H), 1.78-1.74 (m, 4H), 1.61 (m, 4H), 1.41-1.18 (m, 24H); FT-IR (ATR) v in cm$^{-1}$ 2916, 2846, 1462, 1413, 1327, 1292, 1270, 1246, 1216, 1123, 1092, 774, 724.

Poly((dodecanyl)sulfone). $^1$H NMR (300 MHz, C$_2$D$_2$Cl$_4$) δ (ppm) 2.95-2.89 (t, 4H), 1.81-1.66 (m, 4H), 1.61 (m, 4H), 1.44-1.26 (m, 12H); 13C NMR (75 MHz, C2D2Cl4) δ (ppm) 52.9, 29.8, 29.5, 28.7, 22.2. FT-IR (ATR) v in cm$^{-1}$ 2916, 2846, 1461, 1413, 1326, 1300, 1267, 1239, 1197, 1123, 1072, 988, 802, 774, 742, 725.

Poly((octanyl)sulfone). $^1$H NMR (300 MHz, C$_2$D$_2$Cl$_4$) δ (ppm) 2.95-2.90 (t, 4H), 1.85-1.75 (m, 4H), 1.48 (m, 4H), 1.46-1.32 (m, 4H); $^{13}$C NMR (75 MHz, C$_2$D$_2$Cl$_4$) δ (ppm) 75.6, 75.3, 74.9, 54.0, 30.1, 29.7, 23.2. FT-IR (ATR) v in cm$^{-1}$ 2936, 2846, 1459, 1412, 1324, 1271, 1224, 1193, 1120, 1011, 775, 745, 728.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A polysulfone, comprising a multiplicity of sulfone units separated by alkylene units in a polymer chain or a copolymer chain, and
    a crosslinking unit comprising a reaction product of either:
        an ethenylene unit with a diacrylate or a dithiol; or
        an epoxy unit with a diol or a diamine, the epoxy unit being derived from an ethenylene unit.

2. The polysulfone according to claim 1, wherein the alkylene units are of the same mass and/or structure.

3. The polysulfone according to claim 1, wherein the alkylene units are of at least three different masses and/or structures.

4. The polysulfone according to claim 1, wherein the alkylene unit is a $C_4$ to $C_{36}$ unit.

5. The polysulfone according to claim 1, wherein the alkylene unit consists of a multiplicity of methylene units.

6. The polysulfone according to claim 1, where at least one of the alkylene units further comprises an ethenylene unit separated from the sulfone units by at least one methylene unit.

7. The polysulfone according to claim 6, wherein each of the alkylene units consists of the ethenylene unit separated from the sulfone units by at least one methylene unit.

8. The polysulfone according to claim 1, wherein on average at least two alkylene units of each polymer chain or copolymer chain comprise a crosslink between at least two polymer chains or copolymer chains.

9. A method of preparing a polysulfone according to claim 1, comprising:
    providing a monomer mixture comprising a multiplicity of at least one α,ω-bis-vinylalkylsulfone monomer and/or a cycloalkenylsulfone wherein a double bond is separated from the sulfone by at least one methylene unit;

adding a metathesis catalyst to the monomer mixture;

removing ethylene to form a polymer comprising a multiplicity of sulfone units separated by alkylene units wherein the ethenylene units comprise ethenylene unit separated from the sulfone units by at least one methylene unit of the alkylene unit, and optionally, reducing at least a portion of the ethenylene units and/or reacting at least a portion of the ethenylene units to form crosslinking units.

10. The method of claim 9, wherein a solvent is included in the monomer mixture.

11. The method of claim 9, wherein the metathesis catalyst is Schrock's catalyst, Grubbs' first generation catalyst, Grubbs' second generation catalyst, or Grubb's catalyst (C668).

12. A membrane, comprising a polysulfone according to claim 1.

13. The method of claim 10, wherein the solvent is methylene chloride.

14. The method of claim 10, wherein the solvent is selected from the group consisting of 1,2-dichloroethane, 1,1,2,2,-tetrachloroethane, toluene, xylenes, ethyl acetate, and THF.

15. The polysulfone of claim 1, wherein the alkylene units include at least one branched alkylene unit.

16. The polysulfone of claim 1, wherein the alkylene units include at least one substituted alkylene unit.

17. The polysulfone of claim 1, wherein the multiplicity of sulfone units separated by alkylene units are in the copolymer chain, and wherein the copolymer chain is formed by copolymerizing $\alpha,\omega$-bis-vinylalkylsulfone monomers with $C_5$ to $C_{20}$ $\alpha,\omega$- alkyldiene monomers or cycloalkane monomers.

18. The polysulfone of claim 17, wherein the polysulfone has a random structure.

19. The polysulfone of claim 1, wherein the polysulfone has a quasiperiodic structure.

20. The polysulfone of claim 1, wherein the polysulfone has a quasirandom random.

* * * * *